Sept. 1, 1964    W. J. SHIMANCKAS    3,146,756
COUPLING
Filed May 1, 1962
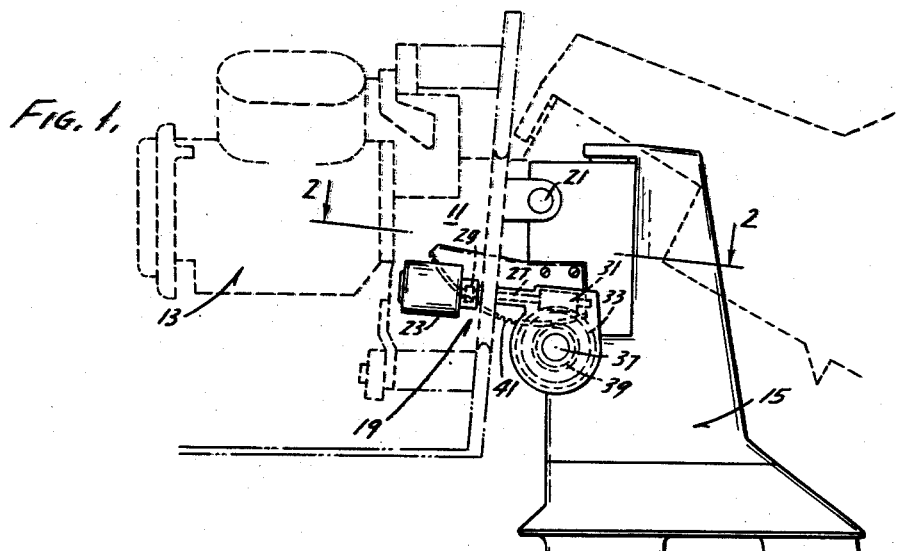
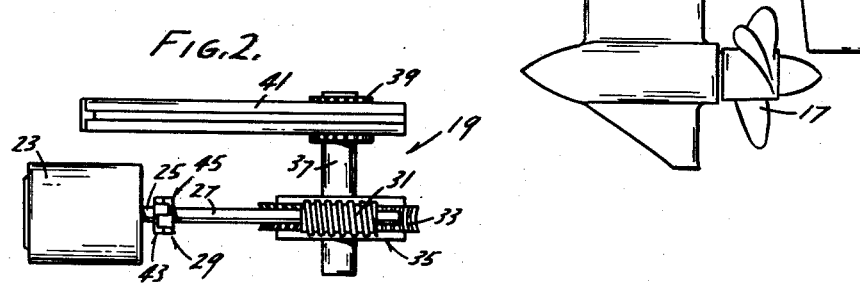
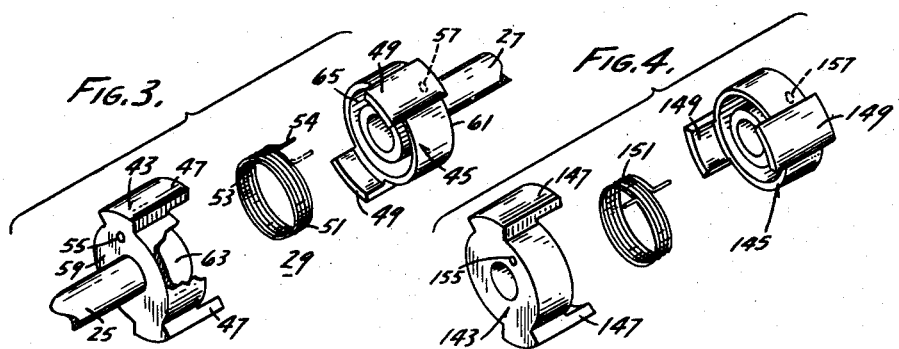
INVENTOR.
WILLIAM J. SHIMANCKAS
BY
Wheeler, Wheeler & Wheeler
ATTORNEYS.

United States Patent Office 3,146,756
Patented Sept. 1, 1964

3,146,756
COUPLING
William J. Shimanckas, Waukegan, Ill., assignor to Outboard Marine Corporation, Waukegan, Ill., a corporation of Delaware
Filed May 1, 1962, Ser. No. 191,471
7 Claims. (Cl. 115—41)

The invention relates to couplings and particularly to couplings for transmitting rotary motion between a driving and driven member.

The invention is generally advantageous in connection with a worm or pinion which is mounted on a rotatably driven member and which is engaged with a worm wheel segment or gear rack segment. If the worm or pinion has previously been advanced to one of the ends of the worm wheel segment or the rack segment, jamming can occur, accompanied by consequent difficulty in dislodging the jammed condition.

Such a jammed condition can be effectively released by rotatably striking the driven member a blow in the proper direction. The invention provides for imparting such a blow by a coupling arrangement which permits initial limited angular motion of a driving shaft or member, from a rest position, relative to the driven shaft or member, thereby allowing the driving member to attain rotary speed prior to encountering any load associated with the driven member.

The attainment of such rotary speed prior to encountering of the load associated with the jammed condition, results in the transmission of a hammer-like blow to the jammed condition, thereby effectively dislodging the jam. Although the coupling arrangement disclosed herein has a wide field of use, it is particularly effective in connection with a mechanism for tilting the lower unit of an outboard motor or stern drive unit in a vertical plane to raise or lower the propeller from or to the water.

Other objects and advantages of the invention will become apparent by reference to the following description and the accompanying drawings, in which:

FIGURE 1 is a side elevational view of a stern drive unit embodying various of the features of the invention;

FIGURE 2 is an enlarged view taken generally along line 2—2 of FIGURE 1, showing the tilting mechanism employed in the stern drive unit shown in FIGURE 1;

FIGURE 3 is an exploded perspective view, partially broken away and in section, of the coupling arrangement employed in the tilting mechanism shown in FIGURE 2; and FIGURE 4 is a view similar to FIGURE 3 showing a modified coupling arrangement.

The disclosed invention can be employed in many different types of mechanical structures and devices, including marine propulsion devices, and is shown incorporated in the stern drive unit 11 illustrated in FIGURE 1. The stern drive unit 11 conventionally includes an engine 13 and a lower unit 15 which carries a propeller 17 and which can be tilted by a tilting mechanism 19 about a horizontal pivot or axis, indicated at 21, to elevate the propeller 17 from its operative position in the water. The tilting mechanism 19, as shown best in FIGURE 2, includes a reversible electric motor 23 having an output shaft 25, and a driven shaft 27 which is connected to the output shaft 25 by coupling means 29 embodying various of the features of the invention. In turn, the drive shaft 27 carries a worm 31 enmeshed with a worm wheel 33 operatively connected with the lower unit 15, preferably through a conventional friction clutch 35, to effect tilting of the lower unit 15 incident to rotation of the driven shaft 27. The frictional clutch 35 permits upward tilting of the lower unit 15 in the event of the striking of a submerged object, and is mounted, in part, on a cross shaft 37 carrying a pinion 39 enmeshed with an arcuate gear segment or rack 41 fixed to the lower unit 15.

Jamming of the tilting mechanism 19 can occur, as for example, during lowering of the lower unit 15, when the lower unit 15 reaches its operative position in the water, by wedging action of the worm 31 with the worm wheel 33. Such a jammed condition can be effectively dislodged without excessive power requirements, by the coupling means 29 which, as seen best in FIGURE 3, comprises a first coupling element 43 secured to the driving output shaft 25 by suitable means, as for instance a shear pin, and a second coupling element 45 which is generally identical in construction to the first coupling element 43 and which is secured to the driven shaft 27 by suitable means, such as a shear pin.

Each of the coupling elements 43 and 45 includes means for engaging the other coupling element to effect rotation of the driven shaft 27 by the driving shaft 25. In the disclosed construction, such means takes the form, on each of the coupling elements 43 and 45, of a pair of diametrically opposed, axially projecting, respective lugs or ears 47 and 49, which lugs have circumferential lengths permitting a limited amount of angular lost motion between the coupling elements. If desired, only one, or more than two, lugs on each coupling element can be employed.

The coupling means 29 also includes resilient means for locating the lugs 47 and 49 in predetermined angular relation to each other when the driving shaft 25 is de-energized, so that upon re-energization thereof, the driving shaft is permitted to rotate through a limited angular range before engagement of the driven lugs 49 by the driving lugs 47. In the disclosed construction, the resilient means takes the form of a helical coil spring 51 having its ends 53 and 54 suitably anchored to the respective coupling elements 43 and 45. More particularly, the spring ends 53 and 54 extend in generally axial alignment with each other and are engaged in respective apertures 55 and 57 in the respective transverse walls 59 and 61 of the coupling elements 43 and 45.

The spring 51 can be anchored to the coupling elements 43 and 45 so as to locate the lugs 47 and 49 for permitting lost motion when the driving shaft 25 is rotated in either the clockwise or counter clockwise directions, or so that lost motion is only available in one rotational direction. In the construction shown in FIGURE 3, the apertures 55 and 57 in the coupling elements 43 and 45 are located adjacent the base of one lug in each pair of lugs 47 and 49. Accordingly, after assembly of the coupling, and when the driving shaft 25 is de-energized, the driving element 43 rotates clockwise, as seen in FIGURE 3, under the influence of the spring 51, and relative to the driven element 45, until the sides of the lugs 47 and 49 enter into abutting engagement. When the driving shaft 25 is rotated in the opposite or counter clockwise direction, the coupling element 43 will initially rotate relative to the driven coupling element 45 through the lost motion range of about 90 degrees against only a minor load presented by the spring 51, thereby permitting the attainment of rotary speed prior to striking of the lugs 49 on the driven coupling element 45. Such striking imparts sufficient impact force to dislodge any jammed condition of the worm 31 with the worm wheel 33 or of the pinion 39 with the end of the rack 41.

In FIGURE 4 there is shown a modification in which lost angular motion between the coupling elements 143 and 145 is provided for both directions of rotation. Specifically, in FIGURE 4, the apertures 155 and 157 are located in spaced relation to the respective lugs 147 and 149 so that, when the spring 151 is untensioned, the lugs 147 and 149 are approximately equiangularly spaced from each other and are therefore movable through angularly extending lost motion ranges of substantially equal distance in response to rotation of the driving element.

In order to preserve the spring 51 from damage, the coupling elements 43 and 45 are formed to provide a housing for the spring. Specifically, the coupling elements 43 and 45 are provided with respective recesses 63 and 65 which are concentric with the connected shafts 25 and 27 and which communicate with the associated respective apertures 55 and 57.

Various of the features of the invention are set forth in the following claims.

What is claimed is:

1. In a coupling for rotatively connecting a pair of members incuuding a driven coupling element, a driving coupling element, and engaging means on each of said coupling elements for direct driving engagement with each other, said engaging means being of such circumferential width as to provide for angular lost motion between said driving and driven coupling elements, and resilient means for locating said engaging means, when said driving element is free of any driving force applied thereto, into positions in angularly spaced relation to each other.

2. Coupling means in accordance with claim 1 wherein said engaging means includes a first lug extending from one of said coupling elements and a second lug extending from the other of said elements into position for engagement with said first lug in response to relative rotation of said coupling elements, thereby to effect rotation of said driven coupling element by said driving coupling element when said lugs are engaged.

3. Coupling means in accordance with claim 1 wherein said resilient means comprising a helical spring located with its axis in general alignment with the rotational axis of said driving and driven coupling elements and means for locating said spring including means anchoring each of the ends of said spring to a different one of said coupling elements so as to dispose said engaging means for limited angular lost motion therebetween in response to rotation of said driving coupling element in a direction counter to the resilient bias of said spring.

4. Coupling means in accordance with claim 1 wherein said resilient means comprises a spring and means for locating said spring relative to said coupling elements so as to provide for such angular spacing between said engaging means as will permit, between said coupling elements, lost motion of substantially equal distances in both rotative directions in response to initial driving rotation of said driving coupling element.

5. Means for rotatively coupling a pair of members so as to provide for initial limited rotation of the driving member relative to the driven member, said means comprising a driving coupling element adapted to be fixed to the driving member,
a driven coupling element adapted to be fixed to the driving member,
engaging means on said driving and driven coupling elements for direct engagement with each other to effect rotation of said driven coupling element by said driving coupling element and for permitting angular lost motion relative to each other through a limited range, and
resilient means connected to said coupling elements for locating said engaging means in angularly spaced relation to each other incident to discontinuation of the rotation of said driving coupling element for future angular lost motion through said range.

6. Marine propulsion apparatus including
a lower unit carrying a propeller,
means for supporting said lower unit for vertical swinging movement relative to an operative position with said propeller disposed for operation in water, and
power operated means for vertically swinging said lower unit and including
an arcuate gear segment connected to said lower unit to cause tilting of said lower unit incident to rotation of said gear segment,
a pinion enmeshed with said gear segment, and
means for rotating said pinion including a motor having an output shaft,
a driven shaft connected to said pinion for rotation of said pinion incident to rotation of said driven shaft, and
coupling means for rotatively coupling said output shaft and said driven shaft and for resiliently providing an initial limited range of angular lost motion of said output shaft relative to said driven shaft in response to rotation of said output shaft in one direction, whereby said driven shaft is rotatively coupled to said output shaft after said output shaft has attained a rotary speed while traversing said limtied angular range.

7. Marine propulsion apparatus including
a lower unit carrying a propeller,
means for supporting said lower unit for vertical swinging movement relative to an operative position with said propeller disposed for operation in water, and
power operated means for vertically swinging said lower unit and including
a worm wheel connected to said lower unit to cause tilting of said lower unit incident to rotation of said worm wheel,
a worm enmeshed with said worm wheel, and
means for rotating said worm including
a motor having an output shaft,
a driven shaft connected to said worm for rotation of said worm incident to rotation of said driven shaft, and
coupling means for rotatively coupling said output shaft and said driven shaft and for resiliently providing an initial limited range of angular lost motion of said output shaft relative to said driven shaft in response to rotation of said output shaft in one direction, whereby said driven shaft is rotatively coupled to said output shaft after said output shaft has attained a rotary speed while traversing said limited angular range.

References Cited in the file of this patent

UNITED STATES PATENTS

| | | |
|---|---|---|
| 1,627,964 | Galloway | May 10, 1927 |
| 2,140,255 | Rieske | Dec. 13, 1938 |
| 2,656,178 | Hughes | Oct. 20, 1953 |
| 2,700,359 | Dewhurst | Jan. 25, 1955 |
| 2,751,987 | Kiekhaefer | June 26, 1956 |
| 3,091,211 | Hansen | May 28, 1963 |